United States Patent [19]

Chen et al.

[11] Patent Number: 5,448,649
[45] Date of Patent: Sep. 5, 1995

[54] APPARATUS FOR IMAGING FINGERPRINT OR TOPOGRAPHIC RELIEF PATTERN ON THE SURFACE OF AN OBJECT

[76] Inventors: Wang S. Chen, Institute of Electro-Optical Engineering National Chiao Tung University, Hsinchu; Chen-Lung Kuo, No. 33 L-407 Chi-Lin Rd., Taipei 104, both of Taiwan

[21] Appl. No.: 248,310

[22] Filed: May 24, 1994

[51] Int. Cl.⁶ .............................................. G06K 9/00
[52] U.S. Cl. ...................................... 382/126; 356/71; 359/831
[58] Field of Search ........................ 382/4, 5; 356/71; 359/831

[56] References Cited

U.S. PATENT DOCUMENTS

| | | | |
|---|---|---|---|
| 4,120,585 | 10/1978 | De Palma et al. | 359/831 |
| 4,525,859 | 6/1985 | Bowles | 382/5 |
| 4,537,484 | 8/1985 | Fowler et al. | 382/4 |
| 4,832,485 | 3/1989 | Bowles | 382/5 |
| 5,040,223 | 8/1991 | Kamiya et al. | 382/38 |
| 5,146,102 | 9/1992 | Higuchi et al. | 356/71 |
| 5,224,174 | 6/1993 | Schneider et al. | 382/5 |
| 5,289,253 | 2/1994 | Costello et al. | 356/71 |

FOREIGN PATENT DOCUMENTS 2217497 10/1989 European Pat. Off. ...... G06K 9/20

*Primary Examiner*—Joseph Mancuso
*Assistant Examiner*—Bipin Shawala
*Attorney, Agent, or Firm*—W. Wayne Liauh

[57] ABSTRACT

An apparatus for imaging a fingerprint or a topographic relief pattern (i.e., ridges) on the surface of an object comprising: (a) a transparent platen having a top layer of microprisms in a matrix form and a bottom layer of a platen substrate, the top of the layer of microprisms being the surface against which the object is pressed and the bottom surface of the platen substrate being provided for receiving light to illuminate the object surface, both layers of materials having equal or nearly equal refractive indices; (b) a light source with a focusing lens for providing substantially uniform and parallel light rays; (c) a beam splitter for splitting incident light emitted by the light source into tow parts, one part passing through and the other part being reflected by 90 degrees, the beam splitter being positioned at an angle to the object contact surface of the platen so that the reflected beams of the split light enter the platen bottom surface perpendicularly; (d) a 2-D photo electric image sensor with an imaging lens for receiving light reflected from portions of the platen surface not in contact with the object ridges so as to produce an object surface image, the image sensor having a focal plane which is positioned in such a manner such that the focal plane is parallel to portions of the platen surface in contact with the object. The microprisms has sufficient elasticity so that they become deformed when pressed by the object, and return to their original shape when the object impression is released. A fraction of light emitted by the light source enters the platen substrate perpendicularly by means of the beam splitter and travels forward toward faces of the microprisms, the light rays reverse their traveling directions if the microprism faces impinged by the light rays are not in contact with the object ridges and the reversed light rays are then received by the image sensor to give rise of bright regions on the dark background in the object surface image, the dark background is associated with the microprism surfaces which are in contact with the object ridges and is due to sweat on the object ridges or the deformation of the microprism faces.

9 Claims, 13 Drawing Sheets

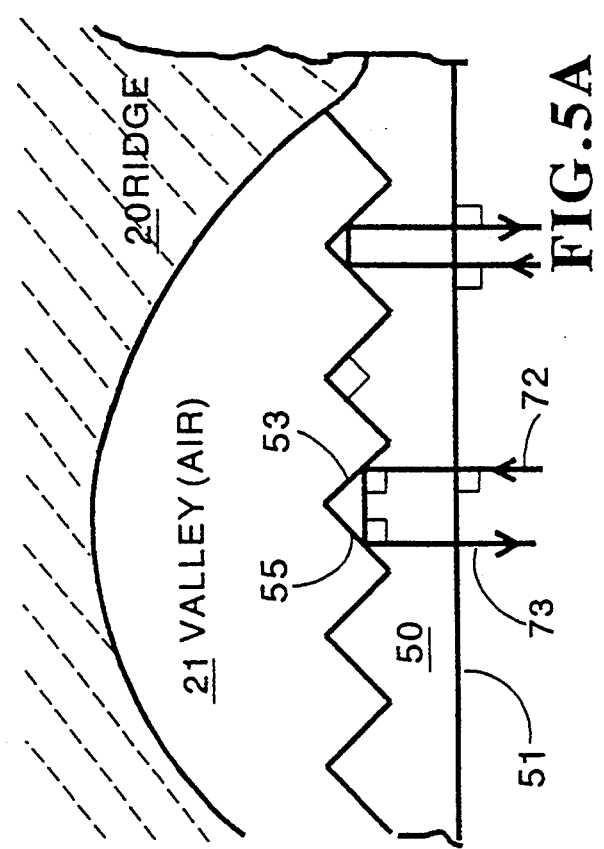

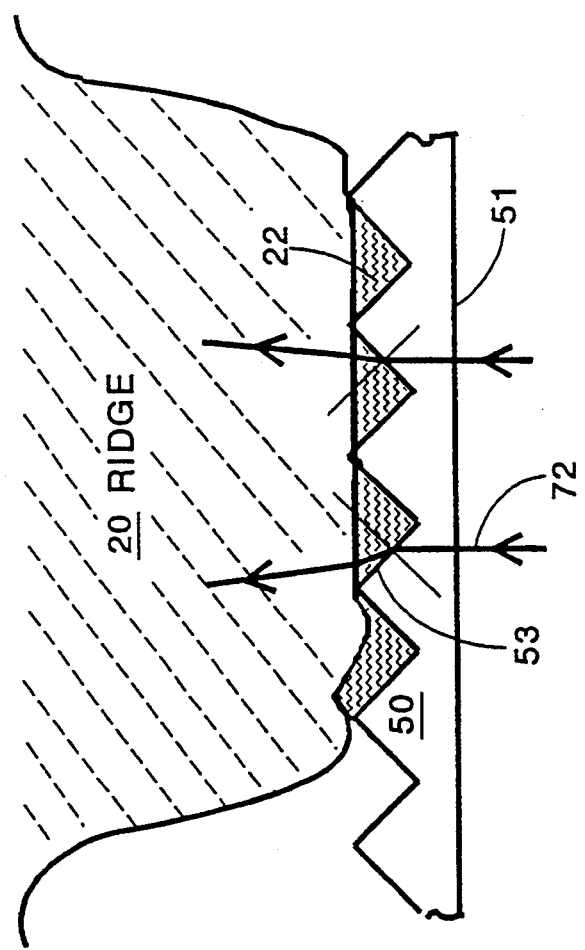

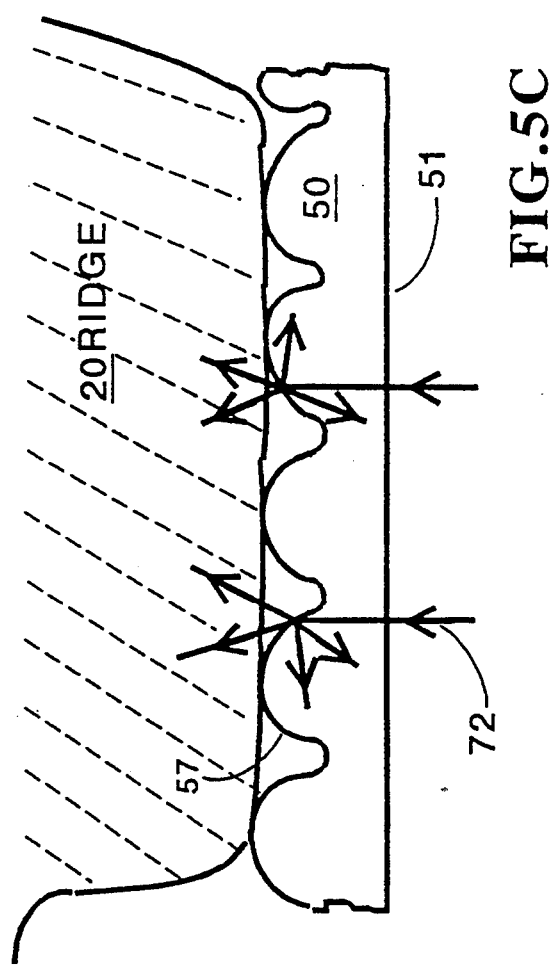

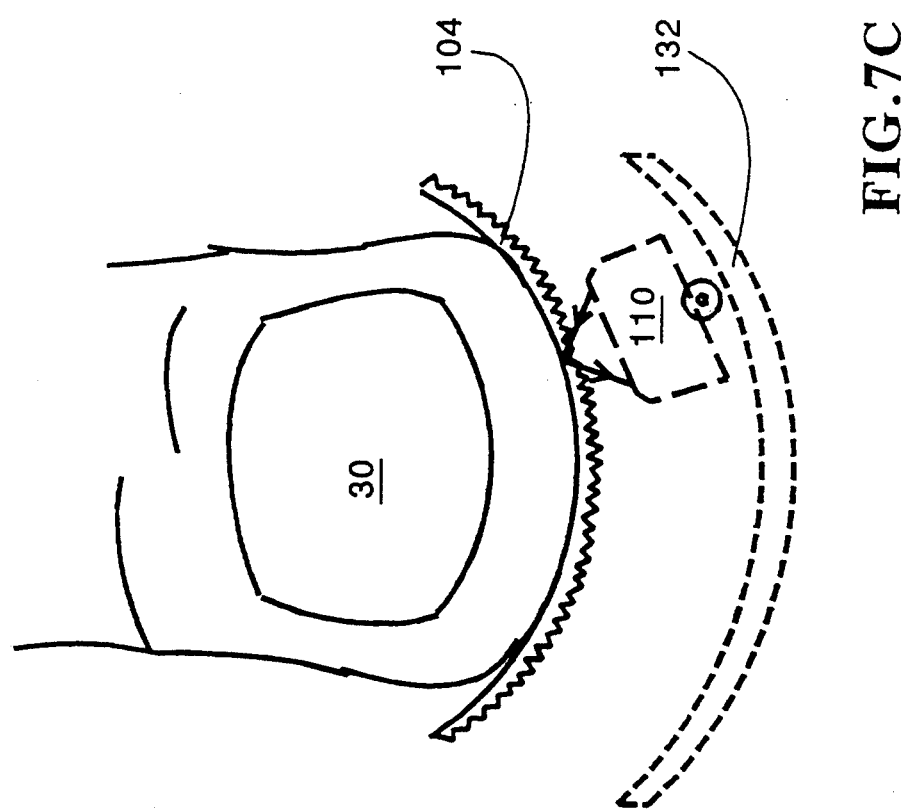

APPARATUS FOR IMAGING FINGERPRINT OR TOPOGRAPHIC RELIEF PATTERN ON THE SURFACE OF AN OBJECT

BACKGROUND OF THE INVENTION

1. Field of the Invention

The invention relates to a system for acquiring a fingerprint image or the like object surface pattern. More specifically, it utilizes a layer of elastic microprisms as a sensing element for reproduction of a distortionless ridge valley pattern and convert the pattern data into a digital form for further storage or analysis.

2. Description of the Prior Art

FIG. 1 illustrates the phenomenon of reflection or refraction of light rays when traveling through two different optical substances. The substance I is a transparent material whose refractive index is Ng; Substance II is another kind of material with a refractive index Ns; The substance III is the air whose refractive index Na is 1. When light ray e strikes the boundary between substances I and II at point d at an incidence angle Og, it is refracted into substance II at an angle Os, denoted as light ray f. Here the refractive indices Ng and Ns and the angles Og and Os must satisfy Snell's Law, i.e., $$Ng \times \sin Og = Ns \times \sin Os,$$

where sin denotes the sine function. Similarly, if the refractive index Na of substance III is smaller than Ng×sin Og, then light ray b will be totally reflected into substance I, when it strikes the boundary between substances I and III at an incidence angle Og. The reflection angle is also equal to Og. In a fingerprint acquisition application, substance I is a transparent sensing element against which a finger to be imaged is placed; substance II is sweat on the ridge portion of a finger and substance III is the air trapped by the valley portion of a finger. Quite many fingerprint imaging apparatus contain a transparent element in the form of a block (or truncated) prism which has a contact face against which is placed a finger to be imaged. The finger surface is illuminated by light entering from another face of the prism. Apparatus utilizing the principle of the total internal reflection to obtain the ridge and valley pattern of the finger are disclosed in a number of patents including U.S. Pat. Nos. 4,120,585 and 4,905,293. The image has a poor contrast with a glass prism, when the finger skin is dry. If a bigger pressure is exerted, a clearer image is obtainable, but with a severe distortion.

In these apparatus the aspect ratio of the ridge/valley image is not 1:1, namely, the horizontal and vertical scales in the image are not equal. This is due to the different lengths of optical paths between the points on the finger surface and the non-parallel viewing face of the prism through which a photo-detector or a CCD camera captures the fingerprint image. To facilitate obtaining a clearer fingerprint image without applying a big finger pressure, U.S. Pat. Nos. 5,051,576, 4,428,670 and 5,096,290 disclose the use of a layer of liquid or elastic material provided on the finger contact face of the prism. The refractive indices of the two materials are chosen to be matched as closely as possible. On the other hand, to obtain the 1:1 aspect ratio image of the fingerprint, U.S. Pat. Nos. 4,553,837 and 4,537,484 disclose the use of a stationary cylindrical-segment platen for receiving a finger to be imaged and a stepper motor driven rotatable carriage housing the light source and photo-detector to generate line by line a roll fingerprint image. It generally takes time to obtain the image of a single finger.

SUMMARY OF THE INVENTION

It is an object of this invention to provide a means for acquiring the image of fingerprint or other object characteristic pattern which has excellent clearness, high contrast and no distortion. Another object of the invention is to provide an imaging apparatus such that the object area to be imaged can be large as in the case of taking a five-finger print or a paw print.

More specifically, the present invention comprises (1) a transparent platen with a window for receiving the finger or object to be imaged, consisting of a layer of elastic microprisms arranged in a matrix form and a layer of transparent substrate, both having the matching indices of refraction; (2) An area or linear light source with a collimator to provide the uniform and parallel light rays. (3) A photo electric imaging device with an assembly of imaging lens whose focal plane or surface is placed parallel to the surface of the platen window; whereby the electric signal of the distortionless ridge and valley image of the finger is generated; (4) A motor-driven carriage which houses the light source and the photo sensitive detector and moves on a fixed track. The carriage scans, in synchronization with the movement, the entire surface of the finger or object to be imaged. The key features of the present invention are the use of the layer of microprisms and the special arrangement of the components of the imaging apparatus. When the finger is impressed, each of the microprisms contacting with a ridge will be deformed as a whole, while the microprisms surrounded by a finger valley remain intact. Therefore, the light internal reflection phenomenon occurs nicely at the finger contact surface and the image will be sharp. The layer of microprisms is so thin that the imaging device focal surface can be placed close and parallel to the platen window. Thus the fingerprint imaging apparatus can be very compact and easy to assemble without any tedious optical alignment.

BRIEF DESCRIPTION OF THE DRAWINGS

FIG. 3 shows the first physical configuration of the microprisms and FIG. 4 shows the second physical configuration of the microprisms;

FIG. 5A is an illustration of the total internal reflection of light rays at the microprism boundary faces surrounded by a finger valley;

FIG. 5B is an illustration of the light refraction at the platen microprism surfaces upon which a wet finger ridge is placed. The spaces between neighboring microprisms are filled with sweat attached on the ridge;

FIG. 5C is an illustration of the light refraction and scattering at the platen microprism surfaces upon which a dry finger ridge is placed; almost no sweat exists in the spaces between the neighboring microprisms, but the microprisms are deformed;

FIG. 7C is a schematic diagram of the fourth embodiment of this invention;

DETAILED DESCRIPTION OF THE PREFERRED EMBODIMENTS

This invention will hereafter be described with reference to a fingerprint impression. However, the same apparatus can be applied equally well to seal impressions or the like.

Figure 1:
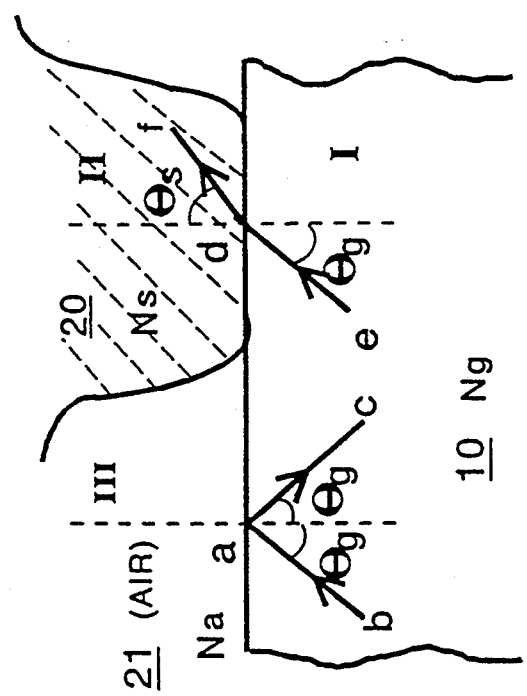
FIG. 1 is a schematic illustration of light refraction and reflection at a boundary between two different optical substances.
Figure 2:
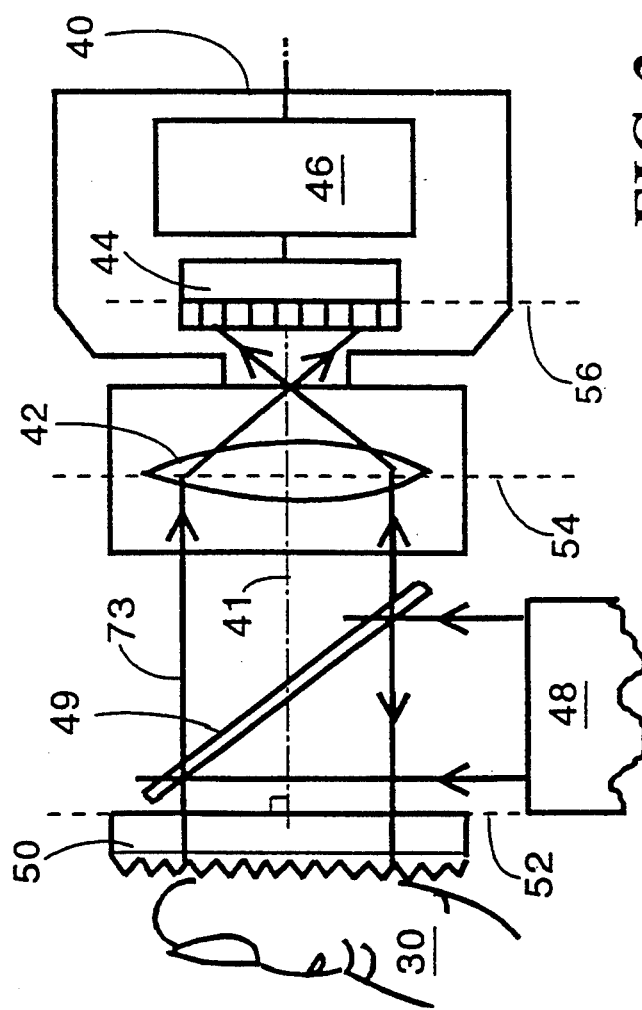
FIG. 2 is a schematic diagram of the first embodiment of this invention.

The first preferred embodiment of this invention will be described with reference to FIG. 2. FIG. 2 illustrates the fingerprint imaging apparatus comprising a light source 48 for generating the substantially uniform and parallel light rays, a light beam splitter 49 allowing half of the incident light to be passed and half to be reflected, a transparent platen for receiving the finger to be imaged 50, and a photo electric imaging device 40. The photo electric imaging device includes a focusing lens assembly 42, a photo-sensitive sensing element 44 and the associated electric circuit 46 for electric signal conversion. The platen surface 52, the focusing lens center plane 54 and the photo-sensitive sensing element plane 56 are all arranged in parallel. In operation, the finger 30 is placed on the platen window surface 50, the ridge-valley pattern of the fingerprint will be sensed by the photo-sensitive sensing element 44 and converted into an digital signal by the associated circuit 46.

Figure 3:
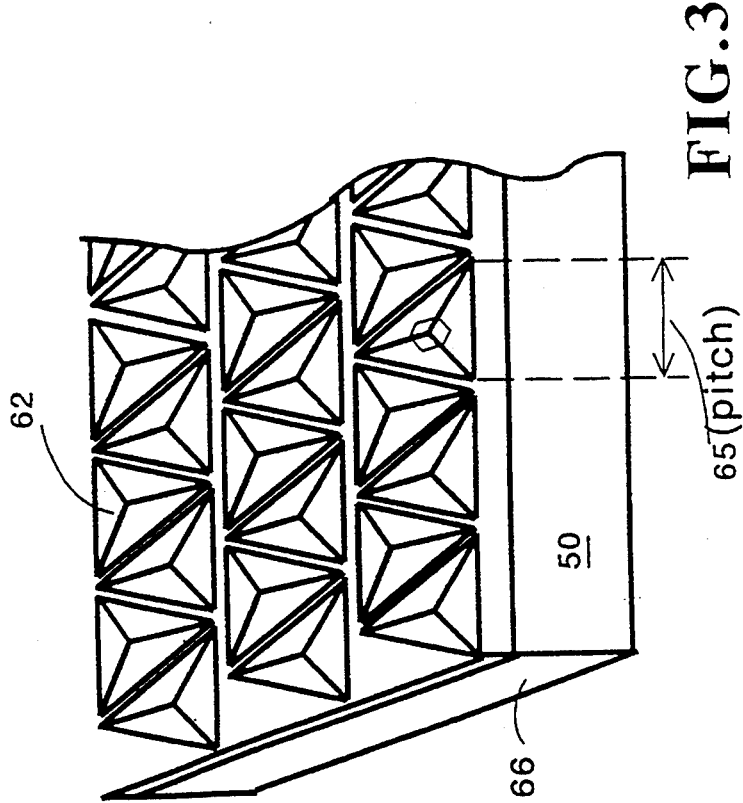
FIGS. 3 and 4 are the perspective views of the arrangements of microprisms in two different physical configurations.
Figure 4:
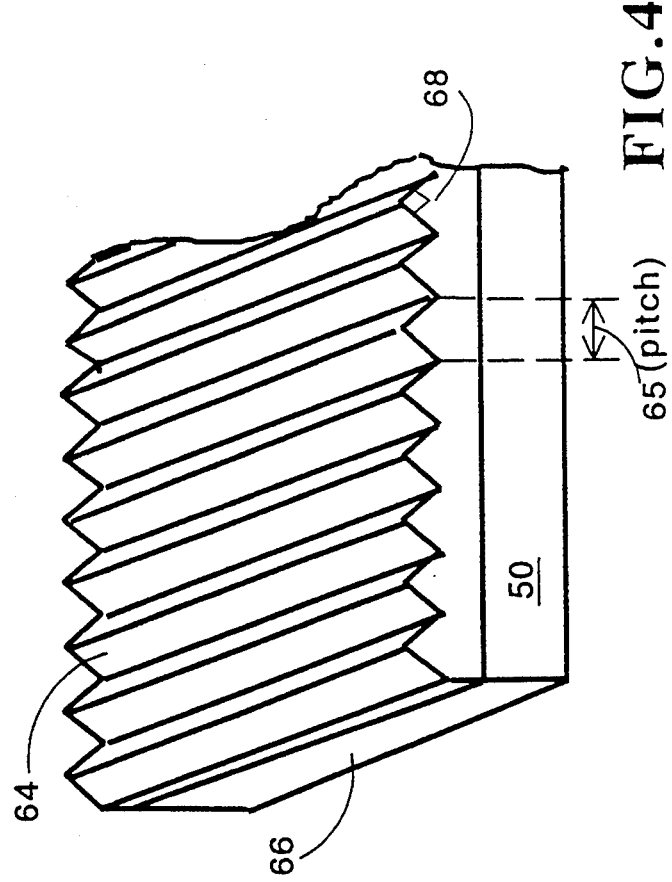
Figure 8:
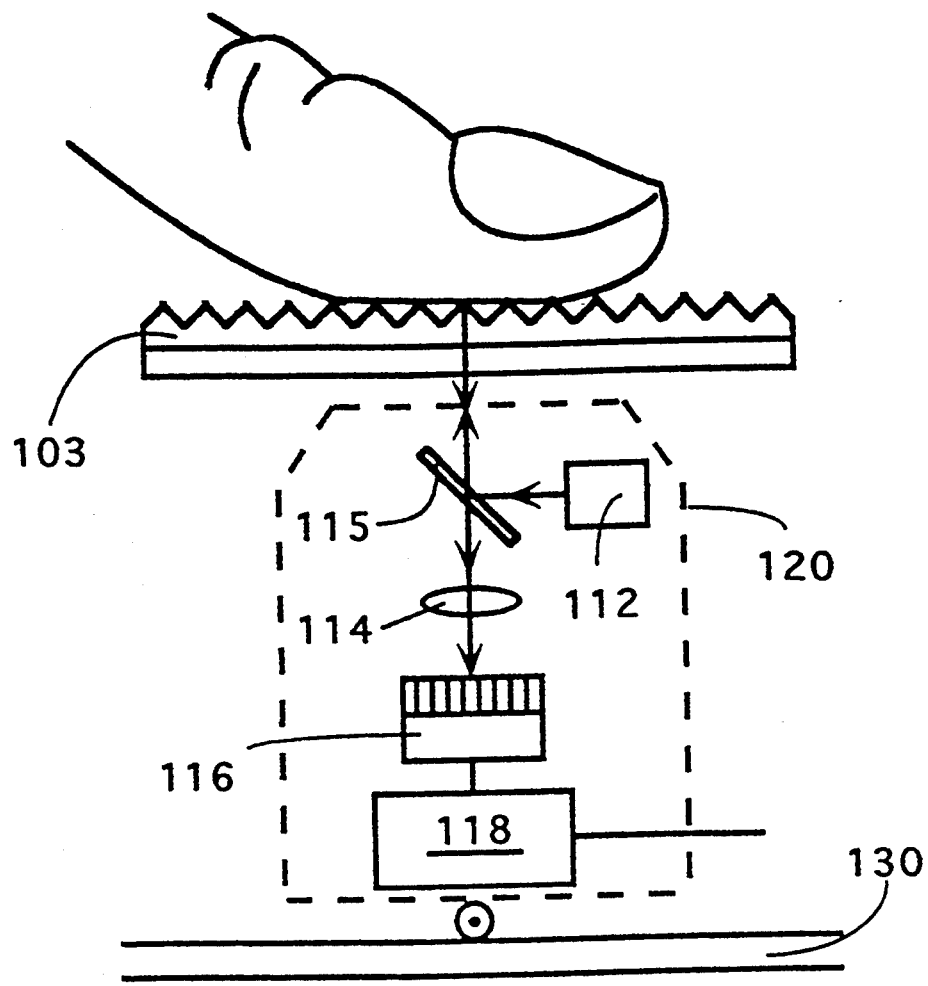
FIG. 8 is a schematic diagram of the fifth embodiment of the invention.

FIGS. 3 and 4 are the arrangements of the two different physical configurations of microprisms used in the platen shown in FIG. 2. FIG. 8 shows the appearance of the first physical configuration of microprisms uniformly distributed on the flat surface of a transparent optical substrate 66 with a matching refractive index; each microprism 62 has three identical faces which are isosceles and right-angled triangles. FIG. 4 shows the appearance of the second physical configuration of microprisms; each microprism 64 is a strip whose cross section is an isosceles and right-angled triangle. The microprism shown in FIGS. 3 and 4 is made of transparent material with a refractive index ranging from 1.42 to 1.84, and preferably has a good elasticity such that the shape deformation disappears once the pressure applied is removed. The pitch 65 of the microprism array should be far smaller than the width of a ridge or valley of the finger (e.g., 50 micrometers or less).

FIG. 5A is an illustration of total internal reflection of light. A light ray 72 enters the substrate surface 51 of the platen 50 perpendicularly. The light ray is totally internally reflected when it strikes the microprism second face 53 and third face 55 which are surrounded by an air layer formed between the microprism boundary faces and a finger valley 21. It is denoted as light ray 73 when it leaves the platen back surface. FIG. 5B illustrates light refraction at a microprism face 53 surrounded by sweat 22 on a wet finger ridge 20. FIG. 5C shows an alternative situation when the finger ridge 20 is dry. In this case the aforesaid microprism faces are deformed when pressed by the finger ridge 20. As a result the light is scattered and no light returns back.

Figure 6A:
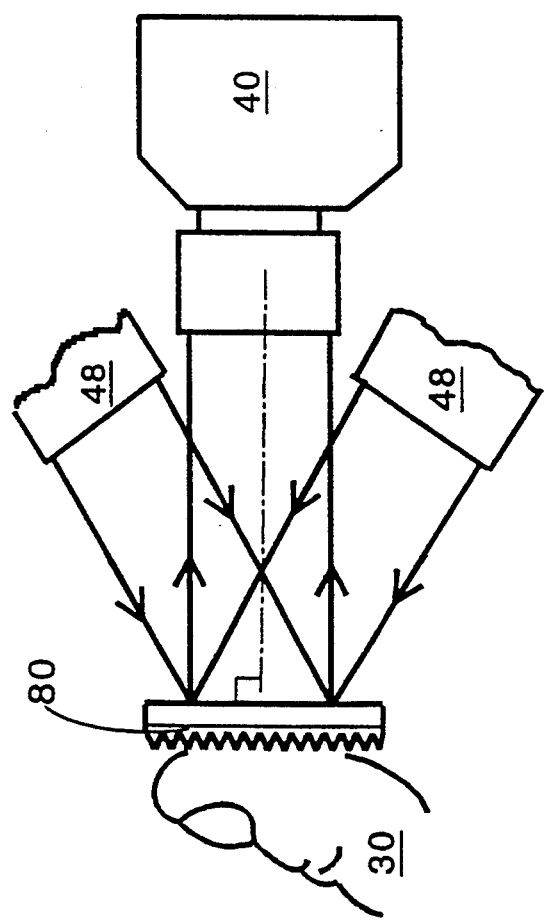
FIG. 6A is a schematic diagram of the second embodiment of this invention.
Figure 6B:
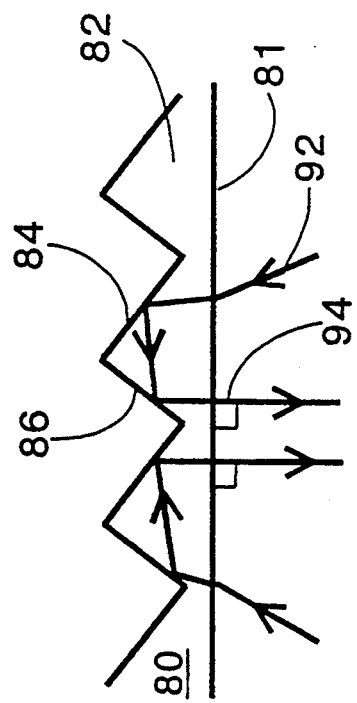
FIG. 6B is an illustration showing the total internal light reflection inside the platen microprisms which have the second physical configuration, as viewed from the cross section line of the microprisms.

FIG. 6A is a schematic diagram of the second embodiment of this invention. The main difference between the second and the first embodiments is the way that the illuminating light is provided. In this case two light sources 48 direct light rays to the back surface 81 of the platen 80 at an oblique incident angle. No light beam splitter is needed. FIG. 6B shows how this embodiment works. The incident light ray 92 enters the platen 80 at an angle to the normal of the platen surface 81. When it strikes the boundary face 84 surrounded by an air layer trapped by a finger valley, it is totally internally reflected and reaches another boundary face 86. The light ray is once again totally reflected and leaves the platen surface 81 perpendicularly, as indicated by light ray 94. In this embodiment the microprisms have the second physical configuration illustrated in FIG. 4 with a variety of triangular cross sections. The cross section shape is preferably a non right-angled triangle. Once the cross section shape is chosen, the incidence angle of light ray 92 is determined.

Figure 7A:
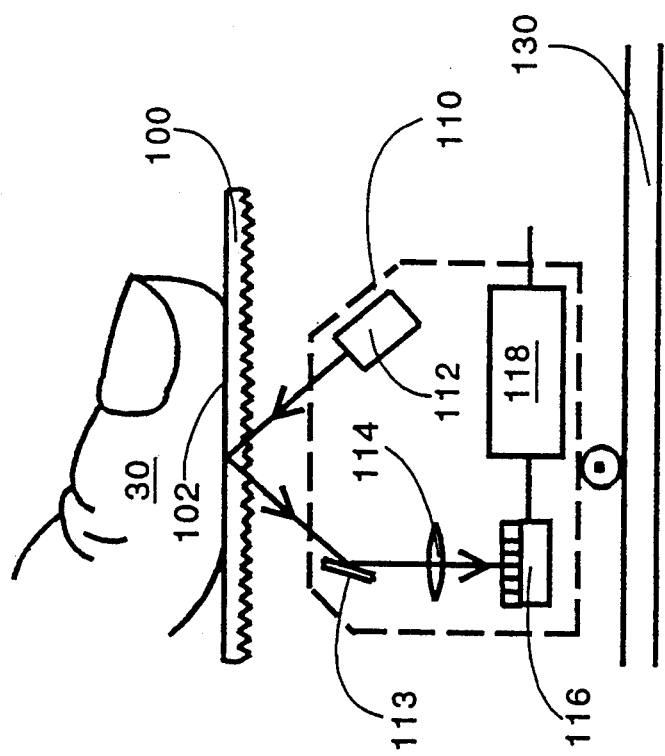
FIG. 7A is a schematic diagram of the third embodiment of this invention.

FIG. 7A is an illustration of the third embodiment of this invention, preferably used in the case where a large scanning area is required. The platen is basically the same as that used in the first two embodiments using the microprism configuration shown in FIG. 4. However, the two end surfaces of the platen 100 should be interchanged, with the substrate surface 102 being the surface on which a finger 30 is placed. A mobile carriage 110 contains a 1-D light array 112, a reflecting mirror 113, a 1-D image sensor 116 and its associated circuit 118, and a focusing rod lens array 114. The carriage moves on a track 130 under the control of a motor device not shown here for a better illustration clarity.

Figure 7B:
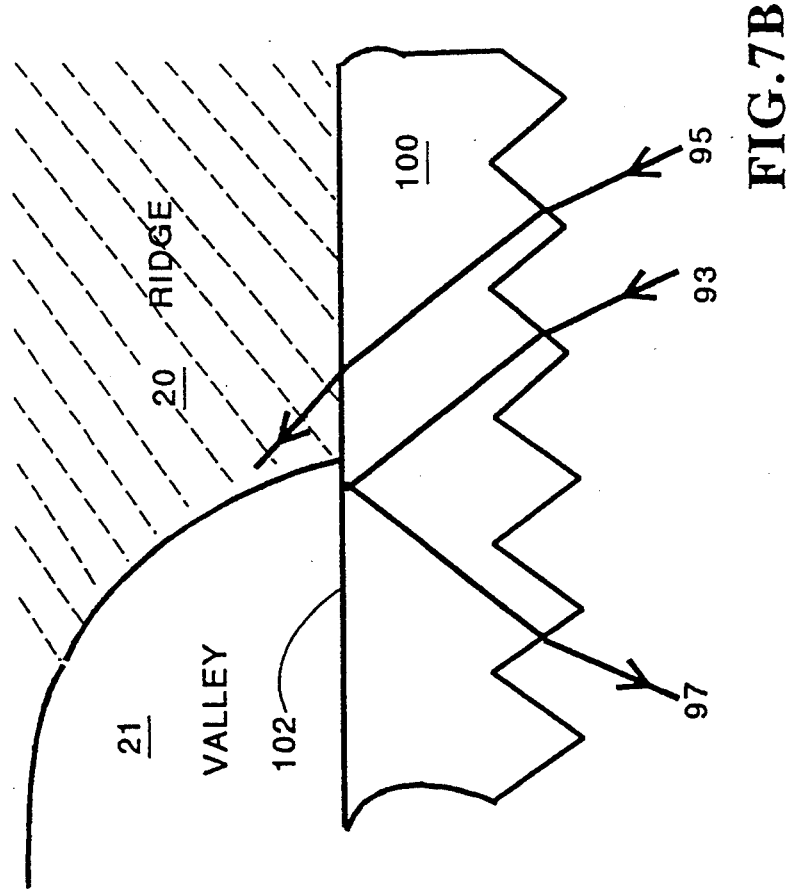
FIG. 7B is an illustration showing both the light total internal reflection and refraction at different platen surfaces where the refractive index changes, depending on whether a finger valley or ridge is in contact.

FIG. 7B shows how the embodiment of this invention works. A light ray 93 is incident on the boundary face 102 of the platen 100 surrounded by a finger valley 21, resulting in a total internal light reflection. The totally reflected light ray 97 is reflected by mirror 113 and then arrives the 1-D image sensor array 116. As a consequence, a bright region is recorded in the fingerprint image. On the other hand, incident light ray 95 strikes the boundary of the platen which is in contact with sweat on a finger ridge 20, the light ray is refracted and no light returns to the 1-D) image sensor 116, resulting in the dark background in the fingerprint image.

FIG. 7C shows the fourth embodiment of this invention which is similar to the one shown in FIG. 7A except that the platen 104 and the carriage track 132 take the form of partial cylindrical surface so that a roll fingerprint image can be obtained.

Figure 9:
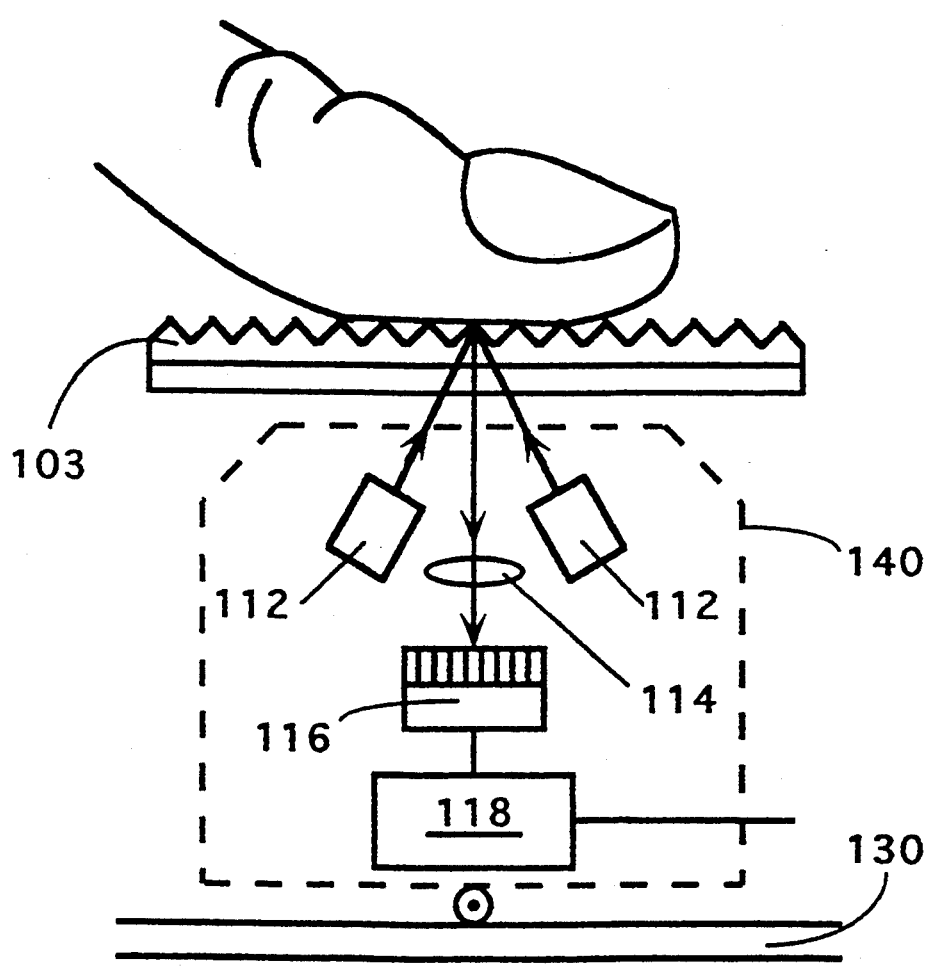
FIG. 9 is a schematic diagram of the sixth embodiment of the invention.

FIG. 8 is an illustration of the fifth embodiment of this invention which is similar to the embodiment shown in FIG. 7A in the sense that both are mobile. The carriage includes 1-D light array 112, beam splitter 115, rod lens array 114, 1-D image sensor 116, and the associated circuit 118. The arrangement of these components is similar to that shown in FIG. 2, FIG. 9 illustrates the sixth embodiment of this invention which is equal to the one shown in FIG. 8 except that two 1-D light arrays 112 are used and no light beam splitter is used. The imaging mechanism is similar to that explained in FIG. 5.

What we claim is:

1. An apparatus for imaging a fingerprint or a topographic relief pattern on a surface of an object, said object having a plurality of ridges as a result of said fingerprint or said topographic relief patterns provided thereon, and said apparatus comprising:
   (a) a transparent platen having a top layer of microprisms in a matrix form and a bottom layer of a platen substrate, the top of said top layer of microprisms being the surface against which said object is pressed and the bottom surface of said platen substrate being provided for receiving light to illuminate said object surface, both layers of materials having equal or nearly equal refractive indices;
   (b) a light source with a focusing lens for providing substantially uniform and parallel light rays;
   (c) a beam splitter for splitting incident light emitted by said light source into tow parts, one part passing through and the other part being reflected by 90 degrees, said beam splitter being positioned at an angle to the object contact surface of said platen so that said reflected beams of the split light enter said platen bottom surface perpendicularly;
   (d) a 2-D photo electric image sensor with an imaging lens for receiving light reflected from portions of said platen surface not in contact with said object ridges so as to produce an object surface image, said image sensor having a focal plane which is positioned in such a manner such that said focal plane is parallel to portions of said platen surface in contact with said object;
   (e) further wherein said microprisms being of sufficient elasticity so that said microprisms become deformed when pressed by said object and return to the original shape when object impression is released;
   whereby a fraction of light emitted by said light source enters said platen substrate perpendicularly by means of said beam splitter and travels forward toward faces of said microprisms, said light rays reverse their traveling directions if said microprism faces impinged by said light rays are not in contact with said object ridges and said reversed light rays are then received by said image sensor to create a bright region on the dark background in said object surface image, said dark background is associated with said microprism surfaces which are in contact with said object ridges and is due to sweat on said object ridges or the deformation of said microprism faces.

2. The apparatus of claim 1 wherein said microprism matrix has a pitch which is sufficiently smaller than a width of an object ridge placed against said platen.

3. The apparatus of claim 1 wherein said microprisms have four triangular faces, three being right-angled and isosceles and one being equilateral, said equilateral triangle being the microprism face resting on a flat surface of said platen substrate.

4. The apparatus of claim 1 wherein said microprisms have a strip structure with a cross section which is a right-angled and isosceles triangle.

5. An apparatus for imaging a fingerprint or a topographic relief pattern on a surface of an object, said object having a plurality of ridges as a result of said fingerprint or said topographic relief patterns provided thereon, and said apparatus comprising:
   (a) a transparent platen having a top layer of microprisms in a matrix form and a bottom layer of a platen substrate, the top of said top layer of microprisms being the surface against which said object is pressed and the bottom surface of said platen substrate being provided for receiving light to illuminate said object surface, both layers of materials having equal or nearly equal refractive indices;
   (b) two light sources for emitting substantially uniform and parallel light, said two light sources being so positioned that said emitted light is incident on said platen back surface at an oblique incident angle to the surface normal;
   (c) a 2-D photo electric image sensor with an imaging lens for receiving light reflected from portions of said platen surface not in contact with said object ridges so as to produce an object surface image, said image sensor having a focal plane which is positioned in such a manner that said focal plane is parallel to portions of of said platen surface in contact with said object;
   (d) wherein said microprism matrix having a pitch which is sufficiently smaller than a width of an object ridge placed against said platen; and
   (e) further wherein said microprisms being of sufficient elasticity so that said microprisms become deformed when pressed by said object and return to its original shape when the object impression is released;
   (f) whereby light entering said platen surface at an inclined angle is reflected back to said platen surface perpendicularly, if a finger valley is present at boundary faces of the microprism.

6. The apparatus of claim 5 wherein said microprisms have a strip structure whose cross section is a triangle.

7. Apparatus for imaging a fingerprint or a topographic relief pattern on a surface of an object, said object having a plurality of ridges as a result of said fingerprint or said topographic relief patters provided thereon, and said apparatus comprising:
   (a) a transparent platen having a bottom layer of microprisms in a matrix form and a top layer of flat substrate, the top surface of said platen substrate being the surface against which said object is pressed and the bottom surface of said platen microprism for receiving light to illuminate said object surface, both layers of materials having equal or nearly equal refractive indices;
   (b) a mobile carriage housing a 1-D light array with a rod lens array for emitting substantially uniform and parallel light, and a 1-D image sensor;
   (c) a motor and motor control device for controlling the movement of said carriage;
   (d) a track on which said carriage is to move under the control of said motor control device;
   (e) wherein said microprism have a strip structure with a triangular cross section;
   whereby said 1-D light array and said 1-D image sensor are so arranged that light rays incident at an angle to said platen microprism surface will be reflected back to said 1-D image sensor to produce a one-line image of said object surface, said carriage moving at a speed in synchronization with the sensing rate of 1-D image sensor to produce a 2-D image of said object surface pattern.

8. The apparatus of claim 7 wherein said platen and said track take the form of partial cylindrical surfaces so as to obtain a roll fingerprint image.

9. The apparatus of claim 1 wherein said apparatus is provided for imaging a fingerprint and said pitch of said microprism matrix is 50 micrometers or less.

* * * * *